United States Patent [19]
Ware et al.

[11] 4,347,426
[45] Aug. 31, 1982

[54] ARC-SPOT WELDING METHOD AND APPARATUS

[75] Inventors: Don A. Ware, St. Charles; Steve A. Coughlin, Ballwin; Oscie B. Whatley, Florissant, all of Mo.

[73] Assignee: ACF Industries, Incorporated, New York, N.Y.

[21] Appl. No.: 175,211

[22] Filed: Aug. 4, 1980

[51] Int. Cl.³ .............................................. B23K 9/12
[52] U.S. Cl. ................................ 219/125.1; 219/127; 219/137 R; 219/161
[58] Field of Search ................ 219/125.1, 127, 137 R, 219/161

[56] References Cited

U.S. PATENT DOCUMENTS

| | | | |
|---|---|---|---|
| 2,803,739 | 8/1975 | Bentzen | 219/125.1 |
| 2,868,950 | 1/1959 | Gage | |
| 2,886,696 | 5/1959 | Tuthill et al. | |
| 2,919,341 | 12/1959 | Roth et al. | |
| 3,210,519 | 10/1965 | Kerchoff | 219/125.1 |
| 3,469,059 | 9/1979 | Sowa | |
| 3,476,908 | 11/1979 | Frindel | |
| 3,479,484 | 11/1969 | Alleaome | |
| 3,536,887 | 10/1970 | Herbst et al. | 219/161 |
| 3,657,511 | 4/1972 | Friedman et al. | |
| 3,670,139 | 6/1972 | Pandjiris et al. | |
| 3,712,529 | 1/1973 | Ozawa et al. | |
| 3,817,440 | 6/1974 | Bartley | |
| 3,937,918 | 2/1976 | Robertson | |
| 4,008,384 | 2/1977 | Cecil | |
| 4,034,212 | 7/1977 | Paxton | |
| 4,056,705 | 11/1977 | Linam et al. | |
| 4,121,084 | 10/1978 | Wear | |
| 4,160,147 | 7/1979 | Matsubara et al. | |

Primary Examiner—C. C. Shaw
Attorney, Agent, or Firm—Henry W. Cummings

[57] ABSTRACT

A method and apparatus for making a plurality of arc-spot welds in a predetermined pattern is disclosed. A plurality of welding torches are mounted upon a carriage which is longitudinally movable relative to a work piece. The work piece is supported by work piece supports which are vertically movable to allow exit of a completed work piece and insertion of a new work piece. A clamping assembly mounted above the work piece supports is movable toward the work piece to engage the work piece to hold it in place for welding, and is movable away from the work piece to allow exit of a completed work piece. The carriage is provided with a control which stops the carriage whereby the torches will be located at positions above the work piece corresponding to the desired pattern of arc-spot welds. The control preferably comprises a cam connected to the carriage which follows a track located on the frame which defines the welding pattern. Limit switches located on the cam or the track temporarily stop movement of the carriage and initiate arc-spot welding at desired positions on the pattern. Stop means are provided which engage when the pattern has been completed and initiate movement of the clamp assembly and work piece supports to allow the welded work piece to be moved out of the assembly. Wire feed reels and wire feed motors and drive rolls are mounted on the frame. Flexible conduits containing the weld wire move with the carriage and the torches. Arc burn back is provided to insure that the weld wire is free of the work piece after each arc-spot weld is completed.

40 Claims, 9 Drawing Figures

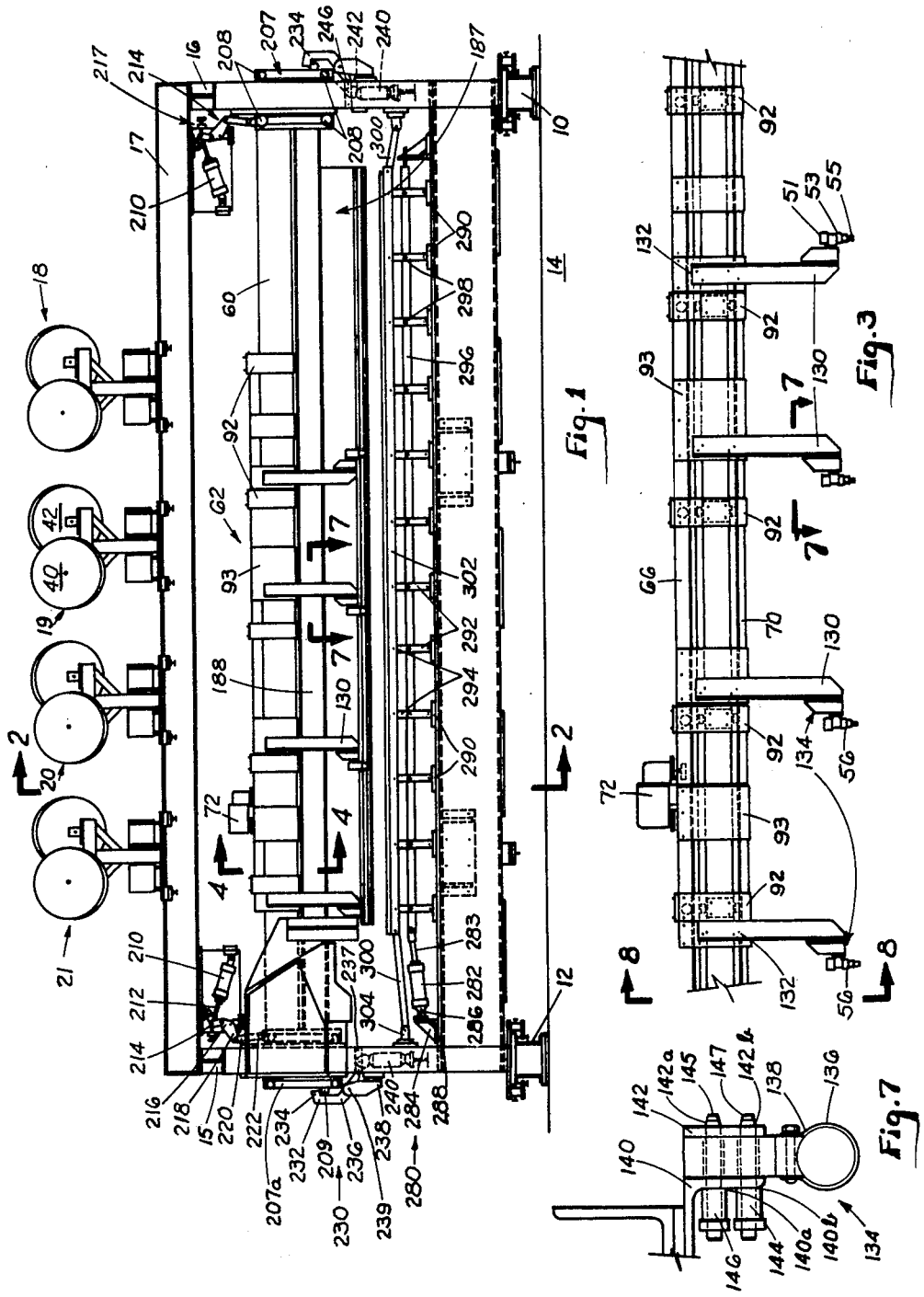

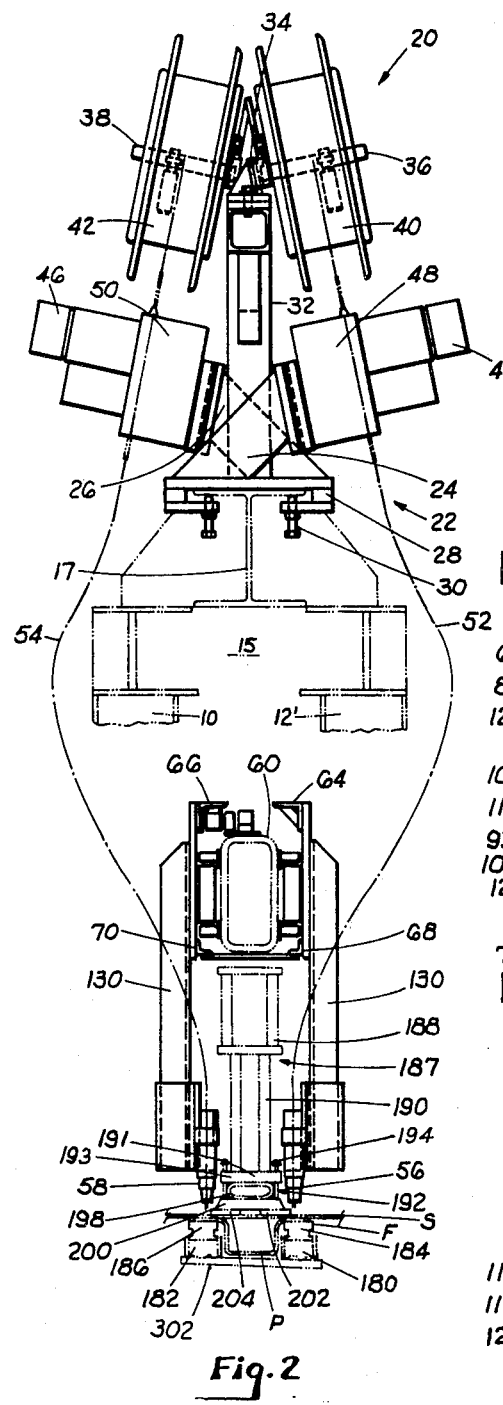
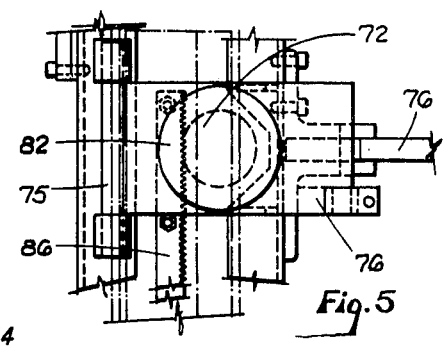
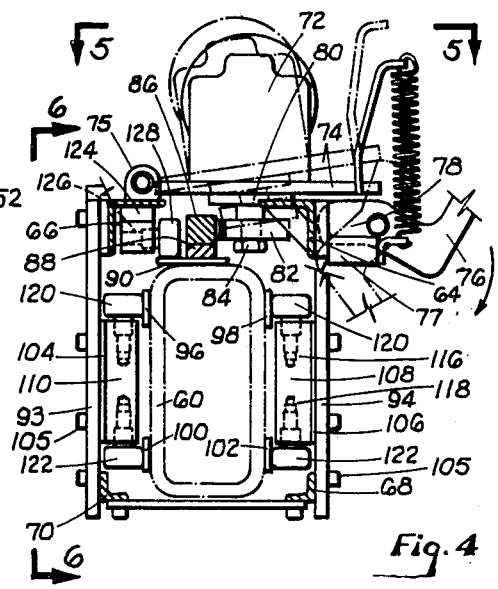
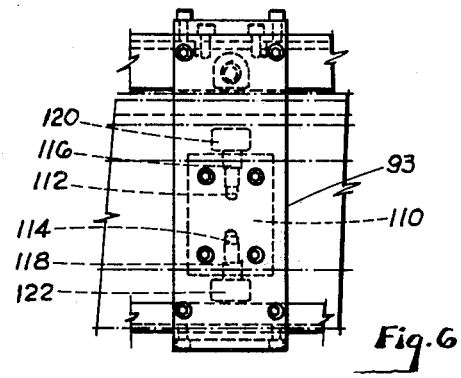

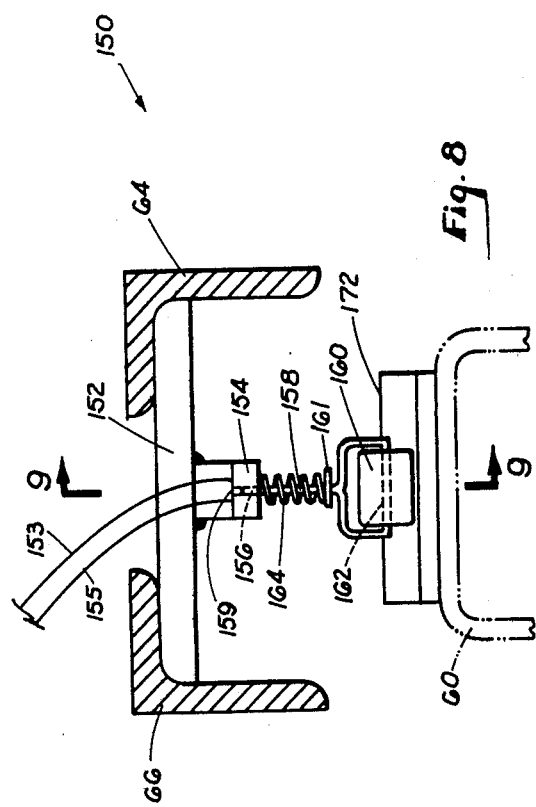
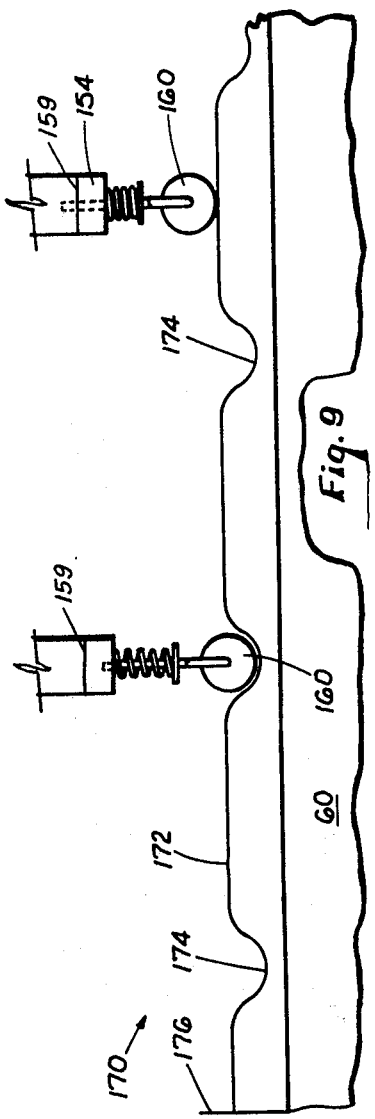

ARC-SPOT WELDING METHOD AND APPARATUS

BACKGROUND OF THE INVENTION

This invention relates to arc-spot welding.

Commonly, arc-spot welding is carried out with the operator manually holding a welding gun against the work piece.

The object of the invention is to provide a method and apparatus for making a plurality of spot welds from a plurality of welding torches automatically according to a predetermined pattern.

IN THE DRAWINGS

FIG. 1 is a side elevation view of the welding assembly of the present invention with the work piece removed.

FIG. 2 is a vertical sectional view of the welding apparatus of the present invention looking in the direction of the arrows along the line 2—2 in view 1.

FIG. 3 is a detail side elevation view of a portion of view 1.

FIG. 4 is a detail view looking in the direction of the arrows along the line 4—4 in FIG. 1.

FIG. 5 is a plan view of a portion of FIG. 4 looking in the direction of the arrows 5—5 in FIG. 4.

FIG. 6 is a view looking in the direction of the arrows along the line 6—6 in FIG. 4.

FIG. 7 is a detail view of the torch connection assembly of the present invention looking in the direction of the arrows 7—7 in FIG. 3.

FIG. 8 is a sectional view looking in the direction of the arrows along the line 8—8 in FIG. 3.

FIG. 9 is a sectional view looking in the direction of the arrows along the line 9—9 in FIG. 8.

SUMMARY OF THE INVENTION

A method and apparatus for making a plurality of arc-spot welds in a predetermined pattern is provided. A plurality of welding torches are mounted upon a carriage which is longitudinally movable relative to a work piece. The work piece is supported by work piece supports which are vertically movable to allow exit of a completed work piece and insertion of a new work piece. A clamping assembly mounted above the work piece supports is movable toward the work piece to engage the work piece to hold it in place for welding, and is movable away from the work piece to allow exit of a completed work piece.

A piston and hydraulic cylinder are conveniently used to move the work piece supports between open and closed positions. The carriage is provided with a control which stops the carriage whereby the torches will be located at positions above the work piece corresponding to the desired pattern of arc-spot welds. The control preferably comprises a cam connected to the carriage which follows a track located on the frame which defines the welding pattern. Limit switches located on the cam or the track temporarily stop movement of the carriage and initiate welding at desired positions on the pattern. Stop means are provided which engage when the pattern has been completed and initiate movement of the clamp assembly and work piece supports to allow the welded work piece to be moved out of the assembly.

Wire feed reels and wire feed motors and drive rolls are mounted on the frame. Flexible conduits containing the weld wire move with the carriage and the torches.

The carriage is preferably movable along a fixed beam such as a rectangular tube. The carriage is preferably driven by an electric motor having a pinion extending therefrom which is movable along the fixed beam. Preferably the fixed beam is provided with guide plates and the carriage is provided with rollers which follow the guide plates. Preferably the carriage is constituted of upper and lower longitudinally extending carriage supports. Preferably vertical supports connect the upper and lower longitudinal carriage supports. Preferably the vertical supports are longitudinally spaced to save weight. Preferably a plurality of torch supports are attached to the carriage and which depend therefrom and support torches for spot welding in the predetermined pattern. The flexible conduits containing the weld wire are connected to the torches and the weld wire is fed through the torches.

The welding method includes an arc burn back period for each torch for a controlled period of time to insure that the weld wire is free of the work piece. Welding parameters are carefully controlled to insure that sound arc-spot welds are obtained.

DESCRIPTION OF PREFERRED EMBODIMENTS

A pair of vertical beams 10 and 12 are mounted on a suitable rigid floor for example, on concrete. Beams 10 and 12 extend upwardly and support transversely running I beams 15 and 16 (FIG. 1). Beam 15 in turn supports a longitudinally running I beam 17.

A plurality of assemblies of welding reels and drives are mounted upon longitudinal beam 17 indicated generally at 18, 19, 20 and 21. Since each of these assemblies is basically constructed in the same manner, only one will be described. As shown in FIG. 2, I beam 17 has mounted thereon a dual wire drive mounting bracket indicated at 22. This bracket includes a first wire drive support 24 and a second wire drive support 26. A wire drive support base 28 is attached to the I beam 17 with fasteners 30.

A weld wire reel support post 32 is welded to a wire drive base 28. Wire reel post 32 has mounted thereon a dual wire reel support 34 including a pair of outwardly extending shafts 36 and 38 upon which are mounted wire reels 40 and 42 in the usual manner. Wire drive motors 44 and 46 are connected to suitable drive rolls 48 and 50 which drive respective weld wire 52 and 54 downwardly to arc welding torches 56 and 58.

A rectangular tube 60 extends between beams 10 and 12 below I beam 17. A carriage indicated generally at 62 (FIG. 1) is mounted for longitudinal movement relative to the rectangular tube 60. This carrige 62 is made up of four angles 64, 66, 68 and 70 (FIGS. 2 and 4) which surround the rectangular tube 60. An electric motor 72 is mounted on a plate 74 which is pivotably mounted by a bracket 75 upon angle 66 (FIG. 4). A motor handle 76 is pivotely mounted upon a bracket 77 connected to angle 64. The handle includes a cam 78 which upon rotation of the handle in the clockwise direction can raise the plate 74 about pivot point 75 and disengage the motor.

In normal position the motor includes a shaft 80 having a pinion 82 mounted thereon by means of a fastening nut 84. A rack 86 is rigidly connected to the rectangular tube 60 by means of spacer 88 and a guide plate 90.

Vertical connector plates 92 and 93 (FIG. 1) spaced longitudinally along the carriage join angles 66 and 70, and plates 94 (FIG. 4) join angles 64 and 68, to form an integral carriage 62 (FIG. 1). A plurality of longitudinal guides 96,98,100 and 102 (FIG. 4) are also welded to the rectangular tube. Spacer plates 104 and 106 are bolted to vertical plates 93 and 94 and cam roller supports 108 and 110 are bolted to spacer plates 106 and 104 respectively with fasteners 105. Each of the cam roller supports include drilled openings 112 and 114 (FIG. 6) into which are inserted cam roller shafts 116 and 118 which support upper and lower cam rollers 120 and 122. In addition a cam roller support 124 (FIG. 4) is bolted to angle 66 and includes a cam roller shaft 126 extending thereinto, which supports an upper cam roller 128 which rides on guide plate 90 adjacent to rack 86. It is thus apparent that electric motor 72 is effective to move the carriage 62 longitudinally relative to the rectangular tube 60.

As shown in FIGS. 1 and 3, a plurality of weld torch supports 130 are attached to the carriage 62 by means of fasteners 132. As is apparent from FIG. 2 some of the weld wire torch supports 130 and on one side of rectangular tube 60 and some are on the other side. In the lower portion of each weld wire support 130 is located a quick connect assembly 134 to enable the torches 56 and 58 to be quickly removed. As shown in FIG. 7, each of the torches 56 and 58 include a collar 136 having an extension 138 integral therewith. Extension 138 extends inwardly to within a pair of torch brackets 140 and 142. Pins 144 and 146 having actuatable overcenter locking ends 145 and 147 are insertable through openings 140a and 142a in the respective brackets 140 and 142 to hold the extension 138 in place. Upon exerting sufficient pull force by the operator the pins 144 and 146 can be removed and a new torch quickly inserted with a minimum amount of time of assembly.

The torches 56 and 58 are conventional arc welding torches purchasable on the open market. They include a body portion 51 including collar 136, a nozzle 53 and a tip 55 (FIG. 3). The torches are adopted to be used with weld wire in the form of a tube having a flux core for the wire located within the center of the tube as is known in the art.

In accordance with an important feature of present invention shown in FIGS. 8 and 9, a control means 150 is provided to control the sequence of arc-spot welding. A plate 152 is welded to angles 64 and 66. Depending from the plate 152 is a cam support 154. Cam support 154 includes an opening 156 which is adopted to receive a cam support shaft 158 which in one position engages an electrical switch 159. Cam support shaft 158 is bifurcated at its lower end and a cam wheel 160 is mounted thereon by virtue of the pin 162. Spring 164 is located between cam support 154 and a spring plate 161. Roller 160 follows a track 170 which is welded to rectangular tube 60. Track 170 includes a flat portion 172 and a plurality of valleys 174. In the position shown on the right hand side of FIG. 9 the roller is following the flat contour 172, switch 159 is engaged, and the motor 72 is running. However, when the roller 160 reaches a valley 174 the roller 160 becomes fully extended. Switch 159 is no longer engaged and sends an electrical signal through leads 153 and 155 to a programmable controller (not shown). An example of a suitable programmable controller is Allen Bradley programmable central (P.C.) No. 1771-OB-OC. As will be apparent to those skilled in the program control art, the apparatus can be programmed to follow a variety of patterns.

The P.C. turns off the motor 72 to stop the carriage from moving, turns on the weld wire feeder motors 44 and 46, and turns on the weld power. Thus weld wire 52 and 54 is driven from reels 40 and 42 into torches 56 and 58. An arc-spot weld is thus to be formed.

The arc-spot welds produced are preferably made at 30 to 40 volts with current of 400-700 amps. Suitable welding equipment includes Lincoln LN9F wire feeders and Lincoln Ideal Arc DC600 arc welders having constant and variable voltage power supply.

The weld wire size is 1/16" to $\frac{1}{8}$". The weld wire type is that specified in American Welding Society (AWS Specification 5.20, Class E-70T-1 or E-70T-2). The work piece is negative and the weld wire is positive. The weld wire 52,54 is fed at a rate that will result in 400-700 amperes of welding current. The weld wire sticks out in operation from $\frac{1}{2}$" to $1\frac{1}{4}$" from the electrical contact tip 55. However during arc-spot welding the torch does not contact the work piece.

A shielding gas of argon and carbon-dioxide is preferably utilized. The $CO_2$ content may vary from 10-50% with the balance argon. The high argon content avoids weld spatter. The $CO_2$ increases the width of weld penetration. A flow rate of 50-60 cubic feet per hour is used. The torches are water cooled.

When the wire impinges upon the work piece an arc starts to form. As each arc starts, the P.C. independently times each arc. After 1-2 seconds of arc time the P.C. turns off each wire feeder independently. After a suitable arc burn-back period, the P.C. turns off the power source to that torch. An arc burn-back period of 0.2 to 0.6 seconds permits the arc to burn back the wire 1/16"-$\frac{1}{2}$" so that the wire is free of the work piece. After the last arc has terminated, the P.C. then starts the motor 72 to move the carriage forward.

As shown in FIG. 2 a work piece P comprising a rail car post is located between work piece supports 180 and 182. A work piece sheet S is located upon the flanges F of the work piece P. Work piece supports 180 and 182 include backup bars 184 and 186. An independent beam 187 comprises a rectangular tube 188, a pair of support plates 190, and a bottom plate 191. Bottom plate 191 is mounted on a clamping assembly 192. This clamping assembly includes an opening 193 on either side of plate 191 to receive bolts or pins 194. A flexible fire hose 198 urges a copper non-magnetic clamp plate 200 having non-magnetic copper shoes 202 and 204 into engagement with a sheet S to hold the same in place during welding. Springs (not shown) bias the clamping assembly into a raised position. Insertion of air through the fire hose moves the clamping assembly into firm engagement with the sheet for welding as shown in FIG. 2.

Means 280 are provided for moving the work piece supports vertically. This means includes a piston 283 extending into a fluid cylinder 282 which is connected to a bracket 284 by means of a pin 286. Bracket 284 is mounted upon a longitudinally extending beam 288 by welding. In addition a plurality of link supports 290 are mounted upon the beam 288. Connected to each of the link supports are lower links 292 and upper links 294. Lower links 292 and upper links 294 are pinned to a link plate 296 by virtue of pins 298. A yoke 300 connected to opposite sides of a support plate 302 and to brackets 304 prevent the work piece support linkage from moving laterally.

When the cylinder 282 is pressurized forward the work piece supports are in the upper position engaging the work piece as shown in FIG. 1. When fluid pressure is applied in the opposite direction the piston 283 is pulled from right to left. This in turn lowers both links 292 and 294 and moves them from right to left in FIG. 1 to a retracted position. Work piece supports 182 and 184 are mounted upon the work piece support plate 302 as shown in FIG. 2 and thus also assume a retracted position.

Independent beam 187 and rectangular tube 60 at either end are connected to a slide assembly 207 including a slide plate 207a which enables each of these members to be moved vertically relative to the columns 10 and 12. Cam rollers 208 permit slide plate assembly 207 to move up and down. Plates 207a include outwardly extending protrusions 209. Fluid cylinders 210 have extending therein pistons 212 which are respectively connected to linkages 214. Linkages 214 are connected to one arm 216 of a bell crank 217 which includes another arm 218. Bell crank arm 218 is connected to a link 220 which is connected by the pin 222 to the slide plates 207a.

When hydraulic fluid is applied to cylinders 210 pistons 212 are retracted. This in turn moves the linkage 214 and pivots the bell crank 217. This in turn pulls link 220 upwardly and lifts independent beam 187 and rectangular tube 60. When the independent beam 187 and the rectangular tube 60 have been raised in this manner, and when the work piece supports have been moved downwardly by virtue of the piston 283 and cylinder 282, a welded work piece can be removed and a new work piece to be welded inserted into the apparatus. When this is done hydraulic fluid is again inserted into the cylinder 210 to extend the piston 212 and move the link 220 downwardly into the position shown in FIG. 1 and welding can resume.

A locking assembly 230 is also provided. This locking assembly 230 includes locking members 232 having hook portions 234 and a pivoting portion 236 which is pivotably mounted about a bracket 238 on each of the vertical beams 10 and 12. Fluid cylinders 240 have pistons 242 extending therein which are adopted to move a plate 246 connected to the end 237 of locking member 232.

It will be apparent that if fluid is applied to cylinders 240 pistons 242 will be moved vertically. This will in turn move plates 246 and pivot arm 236 about pivot point 239. This will result in rotative movement of locking member 232. This movement will be necessary before assembly 206, independent beam 187 and rectangular tube 60 can be moved vertically in the manner described above.

When hydraulic fluid is applied to cylinder 240 in the opposite direction the locking member 232 will move in the opposite direction and return to its original position. This can be done either to lock in place assembly 207 as shown in FIG. 1 or this can be done at a time when slide assembly 207 is raised above locking member 232 to lock slide assembly 207 in the up position. Thus locking members 232 can prevent slide assemblies 207 from assuming the lower, closed position. Hooks 234 block downward movement of slide assemblies 207 because of protrusions 209 on the slide assemblies.

In the operation of the apparatus of the present invention to begin use, the hydraulic fluid is applied first to pistons 240 to pivot locking members 232 outwardly. Then hydraulic fluid is applied to cylinders 210 to raise slide assemblies 207, rectangular tube 60 and independent beam 187. At the same time hydraulic fluid is inserted into cylinder 282 to lower work piece support plate 302 and work piece supports 180 and 182. Then a work piece to be arc-spot welded is inserted into the assembly. For example, a post P having flanges F upon which is resting a sheet S which has been tack welded to the flanges F of the post is inserted. After insertion of the work piece hydraulic fluid is inserted into the cylinders 282 and 210 to return the supports 302 and the work piece to the proper height, and to lower independent beam 187 and rectangular tube 60 to the position shown in FIG. 2. Then hydraulic fluid is applied to cylinder 240 to return locking member 232 to the position shown in FIG. 1 with hook portion 234 engaging protrusion 209. Fluid is then applied to hose 198 to move clamps 204 into position on the work piece. The assembly is then ready for welding.

At this point motor 72, if not already in engaged position, is pivoted by means of handle 76 into the engaged position with rack 86. Motor 72 then drives carriage 62 from right to left in FIGS. 1, 3 and 9. Motor 72 drives the carriage until the first valley 174 is encountered. When this occurs the wheel 160 is no longer biased into the engaged position with switch 159 within the member 154. Switch 159 then signals the programmable controller through leads 153 and 155. When this occurs the motor 72 is automatically shut off and the weld wire drive motors 44 and 46 are automatically turned on. Thus weld wire from reels 40 and 42 is unwound and driven into torches 56 and 58. The arc welding operation then takes place utilizing the welding parameters described above.

In the assembly shown in FIGS. 1 and 3, eight spot welds will be formed. After these welds are completed, the P.C. turns on the motor 72 and the cam 160 follows the flat portion 172 moving carriage 62 with the motor until the next valley 174 is reached and the welding cycle is repeated. In this manner a desired number of spot welds can be made.

It is to be noted that it is possible to offset the torch supports to obtain a pattern other than straight, parallel if desired. When the end of the pattern is reached the cam 160 engages a stop 176. The operator may then wish to move the work piece laterally prior to beginning another series of spot welds. The motor 72 can be reversed in direction to move the carriage from left to right to form additional spot welds in the same manner as described above. The cam wheel 160 is effective to control the position of the spot welds in either direction.

It will also be apparent that the valleys 174 can be provided in any appropriate pattern, and need not be spaced apart an equal distance.

It is also obvious that the cam or wheel could be provided on the fixed member and the track provided on the movable member.

What is claimed is:

1. Apparatus for making a plurality of arc-spot welds in a predetermined pattern comprising: a plurality of torches mounted upon a carriage which is longitudinally movable relative to a work piece; said carriage being movable along a longitudinally extending fixed beam; said fixed beam being movable vertically to allow removal of a completed work piece and insertion of a new work piece; said work piece being supported by at least one work piece support located below the work piece which is vertically movable to allow exit of a completed work piece and insertion of a new work piece; a clamping assembly mounted above said work piece support and being movable toward said work piece to engage said work piece and hold it in place for welding and being movable away from the work piece to allow exit of completed work piece; said carriage being provided with control means which stops said carriage whereby said torches will be located at positions above the work piece corresponding to the desired pattern.

2. Apparatus according to claim 1, wherein said spot weld control means comprises a cam connected to the carriage which follows a track which defines the welding pattern located on the frame.

3. Apparatus according to claim 2, including limit switches located on said cam or track with temporarily stop movement of the carriage and initiate welding at desired positions on the pattern.

4. Apparatus according to claim 3, including means which engage when the pattern has been completed and which initiate movement of the clamp assembly and work piece supports to allow the welded work piece to be moved relative to the assembly.

5. Apparatus according to claim 4, wherein said torches are arc welding torches.

6. Apparatus according to claim 5, including wire feed reels, wire feed motors and drive rolls mounted on a frame support.

7. Apparatus according to claim 6, including flexible conduits containing the weld wire which move with said carriage and said torches.

8. Apparatus according to claim 4, including at least one piston and hydraulic cylinder used to move said work piece support between open and closed position.

9. Apparatus according to claim 1, wherein said carriage is movable along a fixed beam.

10. Apparatus according to claim 9, wherein said fixed beam is a rectangular tube.

11. Apparatus according to claim 10, wherein means for moving the clamping assembly away from the work piece comprise a fixed beam which engages a bottom plate and wherein said fixed beam and said rectangular tube are movable vertically upwardly to allow exit of the work piece.

12. Apparatus according to claim 11, wherein said fixed beam and said rectangular tube are movable vertically by means of a fluid cylinder and a linkage connected to a slide assembly which engages opposite end portions of said fixed beam and said rectangular tube.

13. Apparatus according to claim 12, wherein said linkage includes a bell crank.

14. Apparatus according to claim 12, including means for locking said slide assembly in lower engaged position or in a disengaged upper portion.

15. Apparatus according to claim 14, wherein said locking member includes a hook which engages a protrusion or extension from said slide plate.

16. Apparatus according to claim 15, wherein said locking means includes a pivoted locking member actuaged by a fluid cylinder.

17. Apparatus according to claim 9, wherein said carriage is driven by an electric motor having a pinion extending therefrom which is movable along said fixed beam.

18. Apparatus according to claim 17, wherein said fixed beam is provided with guide plates and the carriage is provided with rollers which follow the guide plates.

19. Apparatus according to claim 18, wherein said carriage is constituted of upper and lower longitudinally extending carriage supports and wherein vertical supports connect the upper and lower longitudinal carriage supports.

20. Apparatus according to claim 19, wherein said vertical supports are longitudinally spaced to save weight.

21. Apparatus according to claim 19, wherein cam rollers are connected to said vertical supports and wherein cam roller shafts are inserted into openings within said upper and lower longitudinal carriage supports.

22. Apparatus according to claim 18, wherein a plurality of torch supports are attached to the carriage and which depend therefrom and support torches for arc-spot welding in the predetermined pattern.

23. Apparatus according to claim 22, wherein said torches are connected to said torch supports with quick connect fittings.

24. Apparatus according to claim 23, wherein said quick connect fittings comprise a pair of plates which receive an extension from said torches and wherein at least one readily removable pin is inserted within openings within the extension and plates.

25. Apparatus according to claim 17, wherein said motor is pivotably mounted and wherein means are provided to pivot said motor between engaged and disengaged positions with respect to said pinion.

26. Apparatus according to claim 9, wherein said clamping assembly above the work piece comprises a flexible hose, a cam plate and at least one shoe which engages the work piece.

27. Apparatus according to claim 26 wherein the cam plate is made of copper and wherein a pair of copper shoes are placed in engagement with the work piece.

28. A method of forming a plurality of arc-spot welds in a predetermined pattern comprising: providing a plurality of arc welding torches mounted upon a carriage which is longitudinally movable relative to a work piece, automatically stopping the carriage whereby the torches will be located at positions above the work piece corresponding to the desired patterns of spot welds; forming an arc between the weld wire in each torch and the work piece when the weld wire approaches or contacts the work piece; timing the duration of each such arc; turning off the wire feeder for each torch independently of other torches; timing an arc burn back period for each torch for a time sufficient to insure that the weld wire is independently free from the work piece; and then terminating the power supply to each torch after said burn back period; forming a plurality of spot welds at the desired positions; and automatically moving the carriage to a new position to form a plurality of additional spot welds.

29. A method according to claim 28, wherein the wire feeder for each torch is turned off between one (1) and two (2) seconds after the arc is initiated.

30. A method according to claim 29, wherein the arc burn back period for each torch is from about 0.2 to about 0.6 seconds.

31. A method according to claim 30, wherein timing of the arc for each torch and timing of the burn back period for each torch is carried out by a programmable controller.

32. A method according to claim 30, wherein said arc welds are made at a voltage of 30 to 40 volts.

33. A method according to claim 32, wherein said arc welds are made at a current of 400-700 amps.

34. A method according to claim 33, wherein said arc welds are made at a flux-core weld wire size of 1/16" to $\frac{1}{8}$".

35. A method according to claim 34, wherein said arc welds are made with a shielding gas.

36. A method according to claim 35, wherein said arc welds are made with a shielding gas content of 10-50% $CO_2$, balance argon.

37. A method according to claim 36, wherein said arc welds are made with water cooled torches.

38. A method according to claim 37, wherein said arc welds are made with a tip to work piece distance of $\frac{1}{2}$" to $1\frac{1}{4}$".

39. Apparatus for forming a plurality of arc-spot welds in a predetermined pattern comprising: a plurality of arc welding torches mounted upon a carriage which is longitudinally movable relative to a work piece; means for automatically stopping the carriage whereby the torches will be located at positions above the work piece corresponding to the desired patterns of spot welds; means for forming an arc between the weld wire in each torch and the work piece when the weld wire approaches or contacts the work piece; timing means for timing the duration of each such arc; means for turning off the wire feeder for each torch independently of other torches; timing means for timing an arc burn back period for each torch for a time sufficient to insure that the weld wire is independently free from the work piece; and means for terminating the power supply to each torch after said burn back period; arc welding means for forming a plurality of arc-spot welds at the desired positions; means for automatically moving said carriage to a new position to form a plurality of additional spot welds.

40. Apparatus according to claim 39, wherein timing of the arc for each torch and the means for timing of the burn back period for each torch is a programmable controller.

* * * * *